(12) United States Patent
Johansen

(10) Patent No.: US 10,456,713 B2
(45) Date of Patent: Oct. 29, 2019

(54) POWER SUPPLY SYSTEM FOR COALESCER

(71) Applicant: Fjords Processing AS, Lysaker (NO)

(72) Inventor: Bjørnar Skaar Johansen, Moss (NO)

(73) Assignee: NOV PROCESS & FLOW TECHNOLOGIES AS, Fornebu (NO)

( * ) Notice: Subject to any disclaimer, the term of this patent is extended or adjusted under 35 U.S.C. 154(b) by 264 days.

(21) Appl. No.: 15/518,975

(22) PCT Filed: Oct. 24, 2014

(86) PCT No.: PCT/EP2014/072862
§ 371 (c)(1),
(2) Date: Apr. 13, 2017

(87) PCT Pub. No.: WO2016/062353
PCT Pub. Date: Apr. 28, 2016

(65) Prior Publication Data
US 2017/0232364 A1    Aug. 17, 2017

(51) Int. Cl.
*B01D 17/06* (2006.01)
*B03C 11/00* (2006.01)
(Continued)

(52) U.S. Cl.
CPC .......... *B01D 17/06* (2013.01); *B01D 17/045* (2013.01); *B03C 11/00* (2013.01); *C10G 33/02* (2013.01); *B03C 2201/02* (2013.01)

(58) Field of Classification Search
CPC ................................ B01D 17/06; C10G 33/02
See application file for complete search history.

(56) References Cited

U.S. PATENT DOCUMENTS

| 2,105,614 | A | * | 1/1938 | Roberts | .............. | C10G 33/02 |
| | | | | | | 204/565 |
| 2,159,682 | A | * | 5/1939 | Wolfe | .............. | C10G 33/02 |
| | | | | | | 204/573 |

(Continued)

FOREIGN PATENT DOCUMENTS

| NO | 20130611 | 5/2013 |
| NO | 20130611 | 11/2014 |
| WO | 2005/076293 | 8/2005 |

OTHER PUBLICATIONS

International Search Report dated Jun. 30, 2015 in International (PCT) Application No. PCT/EP2014/072862.

*Primary Examiner* — Rexford N Barnie
*Assistant Examiner* — David A Shiao
(74) *Attorney, Agent, or Firm* — Wenderoth, Lind & Ponack, L.L.P.

(57) ABSTRACT

A power supply system for an AC type of coalescer including a first transformer, a controllable transformer, a resonant control circuit and a control system. The first transformer has a primary winding with first and second primary terminals and a secondary winding with first and second secondary terminals, where the first and second secondary terminals are provided for connection to electrodes of the coalescer. The controllable transformer has a primary side for connection to an AC power source and a secondary side connected to first and second nodes, where the second node is connected to a second primary terminal of the first transformer. The resonant control circuit is connected between the first node and the second node. The control system is controlling the controllable transformer. The power supply system further comprises a capacitor connected between the first node and a first primary terminal of the first transformer.

14 Claims, 6 Drawing Sheets

(51) Int. Cl.
    *C10G 33/02*     (2006.01)
    *B01D 17/04*     (2006.01)

(56) References Cited

U.S. PATENT DOCUMENTS

| | | | |
|---|---|---|---|
| 2,539,074 A | | 1/1951 | Grove |
| 2,752,000 A | | 6/1956 | Hall |
| 2,855,356 A | * | 10/1958 | Stenzel .................. C10G 33/02 204/563 |
| 2,897,914 A | | 8/1959 | Camp et al. |
| 3,535,614 A | * | 10/1970 | Wilson .................... G05F 1/445 323/242 |
| 4,134,799 A | * | 1/1979 | Allen ..................... G01N 33/28 204/406 |
| 4,400,253 A | | 8/1983 | Prestridge et al. |
| 5,575,836 A | * | 11/1996 | Sugiura .................... B03C 3/68 323/903 |
| 6,547,786 B1 | * | 4/2003 | Goble ................ A61B 18/1206 606/32 |
| 2009/0129124 A1 | * | 5/2009 | Ranstad .................... B03C 3/68 363/17 |
| 2011/0253539 A1 | * | 10/2011 | Akdim .................... B03C 3/017 204/555 |
| 2013/0206001 A1 | * | 8/2013 | Ranstad ................. B03C 3/025 95/26 |
| 2017/0232364 A1 | * | 8/2017 | Johansen ............... B01D 17/06 307/109 |

* cited by examiner

Fig. 1: Prior art

POWER SUPPLY SYSTEM FOR COALESCER

FIELD OF THE INVENTION

The present invention relates to a power supply system for a coalescer.

BACKGROUND OF THE INVENTION

A coalescer is a device which is performing coalescence. It is primarily used to separate emulsions into their components via various processes. One type of coalescer is the electrostatic coalescer which uses electrical fields to induce droplet coalescence in water-in-crude-oil emulsions to increasing the droplet size. After the coalescence it will then be easier to separate the droplets of water from the oil.

A prior art power supply PS for a coalescer is shown in FIG. 1, together with an electric equivalent of the coalescer denoted as EC. The coalescer EC is here comprising an electric equivalent of the coalescer fluid (or emulsion) denoted as EF, comprising a resistor $R_{emul}$ in parallel with a capacitor $C_{emul}$. The coalescer comprises coated electrodes represented by the capacitor $C_{coating}$. Hence, the entire coalescer can be represented as the capacitor $C_{coating}$ connected in series with the parallel connection of the resistor Remul and the capacitor $C_{emul}$. It should be noted that the present coalescer EC is an AC type of coalescer.

The coated electrodes comprise electrodes made of an electrically conducting material with a surface coating. The coating is typically made of polytetrafluoroethylene (also known as Teflon). The purpose of the coating is to prevent short circuit currents which may otherwise occur between pure metallic electrodes if, for example sea water, is introduced into the coalescer.

The power supply PS comprises a first transformer T1, which is a step-up up transformer, typically supplied with primary voltage of typical 250-500 V (rms) and supplies a secondary voltage of typical 5-10 kV (rms) to the electrodes of the coalescer. Due to fluid variations in the coalescer the voltage between these electrodes may vary. Moreover, as the coalescer is a capacitive load, there is also a need to provide the coalescer with reactive power.

Hence, in order to control the voltage supplied to the primary side of the first transformer T1, the power supply PS further comprises a second transformer T2, a magnetic controllable inductor MCI and a resonant control circuit RCC for resonance control.

The second transformer T2 is connected between a power supply source, such as the mains, a generator etc, typically supplying 230V-690 V AC (rms) and the magnetic controllable inductor MCI. The typical output voltage of the second transformer T2 is 500-900V (rms).

The magnetic controllable inductor MCI is described in US 2005190585 and is a device which inductance can be controlled. Hence, the magnetic controllable inductance provides the possibility to control the reactive power supplied to the first transformer T1 and also to control the output voltage level even if the load (the coalescer) is varying.

As discussed above, the capacitance of the load is varying and the inductance of the magnetic controllable inductor MCI is also varying. It is therefore necessary to provide the power supply PS with the resonant control circuit RCC in order to ensure that potentially damaging resonance between the inductance and the capacitance of the entire circuit in FIG. 1.

The power supply PS also comprises a control system for controlling the magnetic controllable inductor MCI.

Such a power supply PC is today sold and marketed by Magtech AS. The total weight of this power supply is typical about 500-800 kg (nominal voltage of 5 kV). The weight is mostly caused by the amounts of copper and iron used in the magnetic devices (transformers T1 and T2 and the magnetic controllable inductor MCI).

There has been a demand for power supplies being able to supply power to larger coalescers, that is, coalescers with higher surface area of the electrodes, higher nominal power (up to approximately 25 kVA) and/or higher nominal voltage levels (up to approximately 15 kV AC (rms)). This will cause the reactive power consumed by the coalescer to increase, which would provide a considerable increase in the size of the magnetic controllable inductor MCI. However, for some projects there has also been a requirement that the total weight of the power supply is kept below 1000 kg. Also for other projects it is desired to reduce the total weight due to the material costs and production costs. Hence, also for other reasons it is desirable to provide a power supply with reduced weight.

Hence, one object of the invention is to provide a power supply that is able to supply power and voltage control to a coalescer with increased size and higher voltage rating, without increasing the total weight of the power supply considerably.

Moreover, one object of the invention is to provide a power supply with reduced risk of short circuit currents between the electrodes of the coalescer. It is also a purpose to be able to reduce the short circuit current if such short currents still occurs.

SUMMARY OF THE INVENTION

The present invention is defined in the enclosed claim 1. Embodiments of the inventions are defined in the dependent claims.

DETAILED DESCRIPTION

Embodiment of the present invention will be described in detail with reference to the enclosed drawings, where:

FIRST EMBODIMENT

Figure 2:
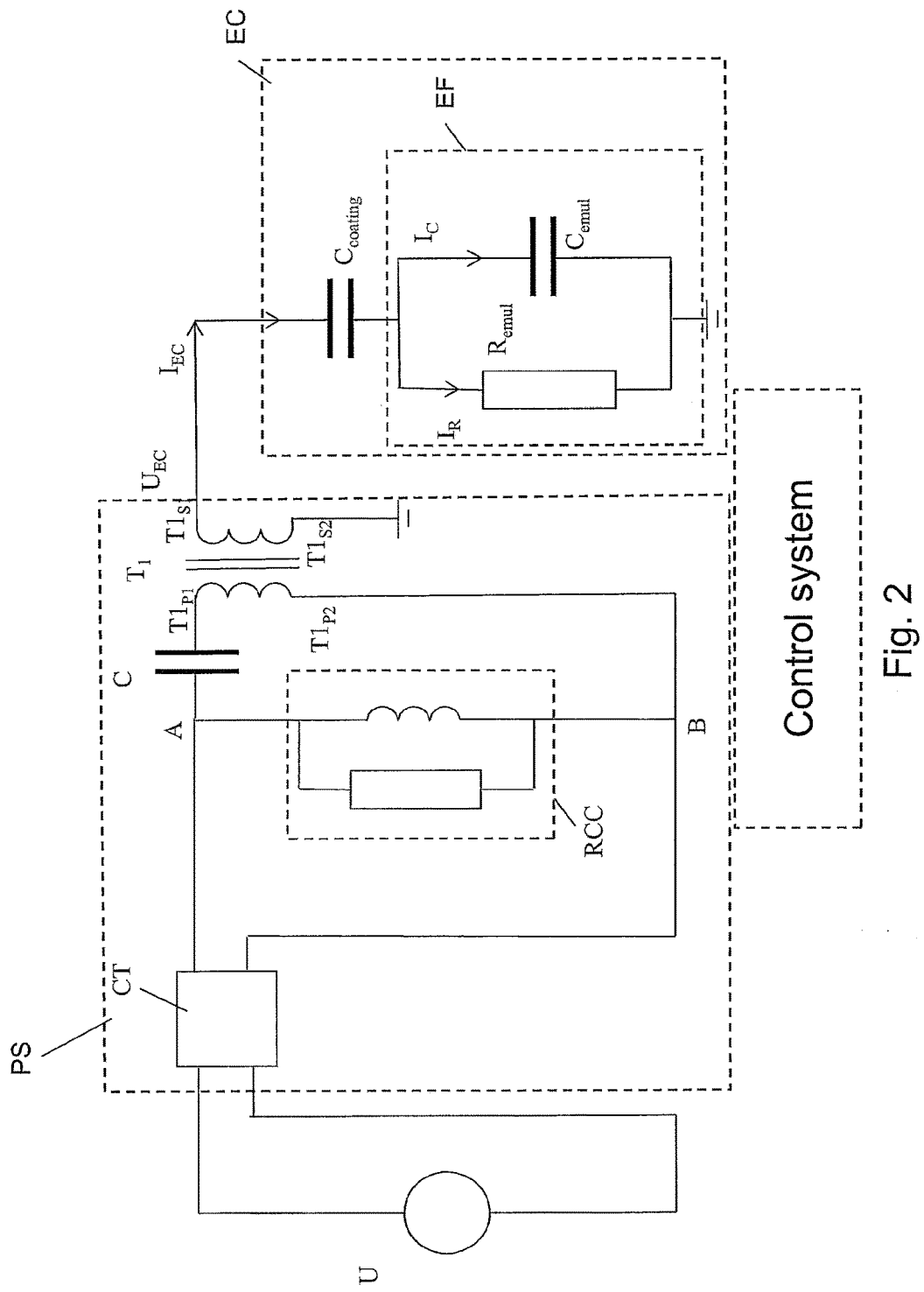
FIG. 2 illustrates a first embodiment of the power supply system for a coalescer.

It is now referred to FIG. 2. Here, it is shown a power supply system PS for an AC type of coalescer. The power supply system is indicated by a dashed box PS in FIG. 2. The electric equivalent of the coalsescer is indicated by a dashed box EC in FIG. 2. As described in the introduction, the coated electrodes of the coalescer EC may be represented by a capacitor $C_{coating}$. The electrodes are typically polytetrafluoroethylene-coated electrodes, although other insulating materials may be used for the coating. The electric equivalent of the fluid between the electrodes is indicated by dashed box EF, comprising a resistor $R_{emul}$ in parallel with a capacitor $C_{emul}$.

Again, the entire coalescer can be represented as the capacitor $C_{coating}$ connected in series with the parallel connection of the resistor $R_{emul}$ and the capacitor $C_{emul}$.

The power supply system PS comprises a first transformer T1 having a primary winding with first and second primary terminals $T1_{P1}$, $T1_{P2}$ and a secondary winding with first and second secondary terminals $T1_{S1}$, $T1_{S2}$. The first and second secondary terminals $T1_{S1}$, $T1_{S2}$ are provided for connection to electrodes of the coalescer EC.

The power supply system PS further comprises a controllable transformer CT having a primary side (left side in FIG. 2) for connection to an AC power source U and a secondary side (right side in FIG. 2) connected to first and second nodes A, B. The second node B is connected to a second primary terminal $T1_{P2}$ of the first transformer T1.

The controllable transformer CT may e.g. comprise a magnetic controllable inductor MCI such as described in US 2005190585. Other controllable transformers or similar circuits may alternatively be used.

The power supply system PS further comprises a resonant control circuit RCC to prevent potentially damaging resonance that could otherwise occur in the circuit consisting of the inductance of the magnetic controllable inductor MCI, the capacitance of the power supply system PS and the coalescer EC. The resonant control circuit RCC may be a passive circuit, for example comprising a resistor in parallel with an inductor as shown in FIG. 2. Alternatively (not shown), the resonant control circuit RCC may comprise active components that are actively connected and disconnected based on the operation state of the power supply system.

The resonant control circuit RCC is connected between the first node A and the second node B.

The power supply system PS further comprises a control system for controlling the controllable transformer CT. This will be described in detail below.

The power supply system PS further comprises a capacitor C connected between the first node A and a first primary terminal $T1_{P1}$ of the first transformer T1. The capacitor C will also be described in further detail below.

SECOND EMBODIMENT

Figure 3:
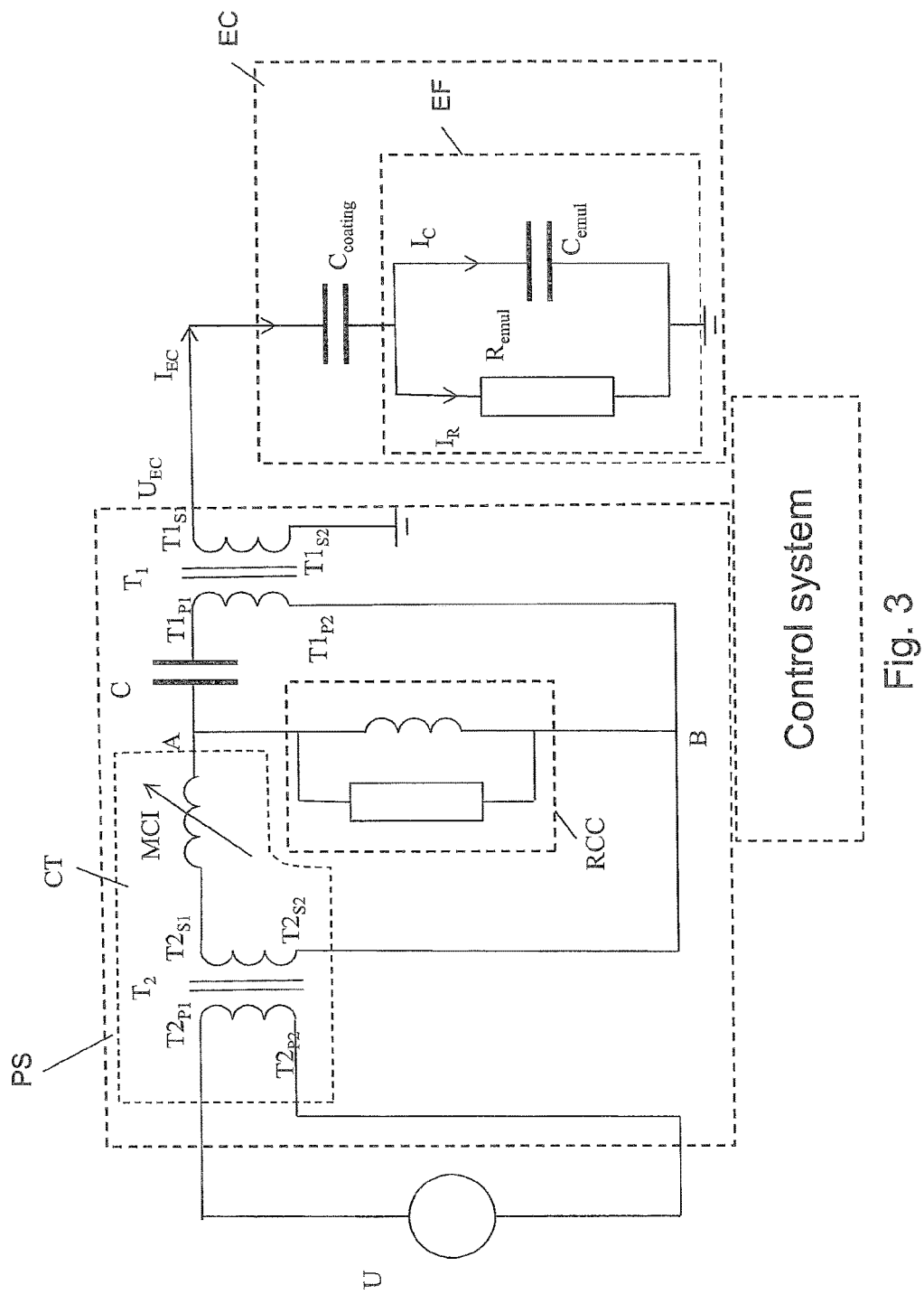
FIG. 3 illustrates a second embodiment of the power supply system for a coalescer.

It is now referred to FIG. 3. Most of the components in FIG. 3 are common with the components of FIG. 2, and the description of those components will not be repeated here.

Specific for the second embodiment is that the controllable transformer CT comprises a second transformer T2 and a magnetic controllable inductor MCI. The second transformer T2 has a primary winding with first and second primary terminals $T2_{P1}$, $T2_{P2}$ and a secondary winding with first and second secondary terminals $T2_{S1}$, $T2_{S2}$.

The first and second primary terminals $T2_{P1}$, $T2_{P2}$ of the second transformer T2 are provided for connection to the AC power source U. The second secondary terminal $T2_{S2}$ is connected to the second node B. The magnetic controllable inductor MCI is connected between the first secondary terminal $T2_{S1}$ of the second transformer T2 and the first node A.

The resonant control circuit RCC is connected between the first node A and the second node B.

Node A is between the MCI and the capacitor C. Node B is between $T1_{P2}$ and $T2_{S2}$.

The magnetic controllable inductor MCI may be of a type which is prior art per se, and comprises a main winding and a control winding, where the inductance of the main winding is controlled by controlling the current in the control winding. The control winding is connected to the abovementioned control system.

Figure 1:
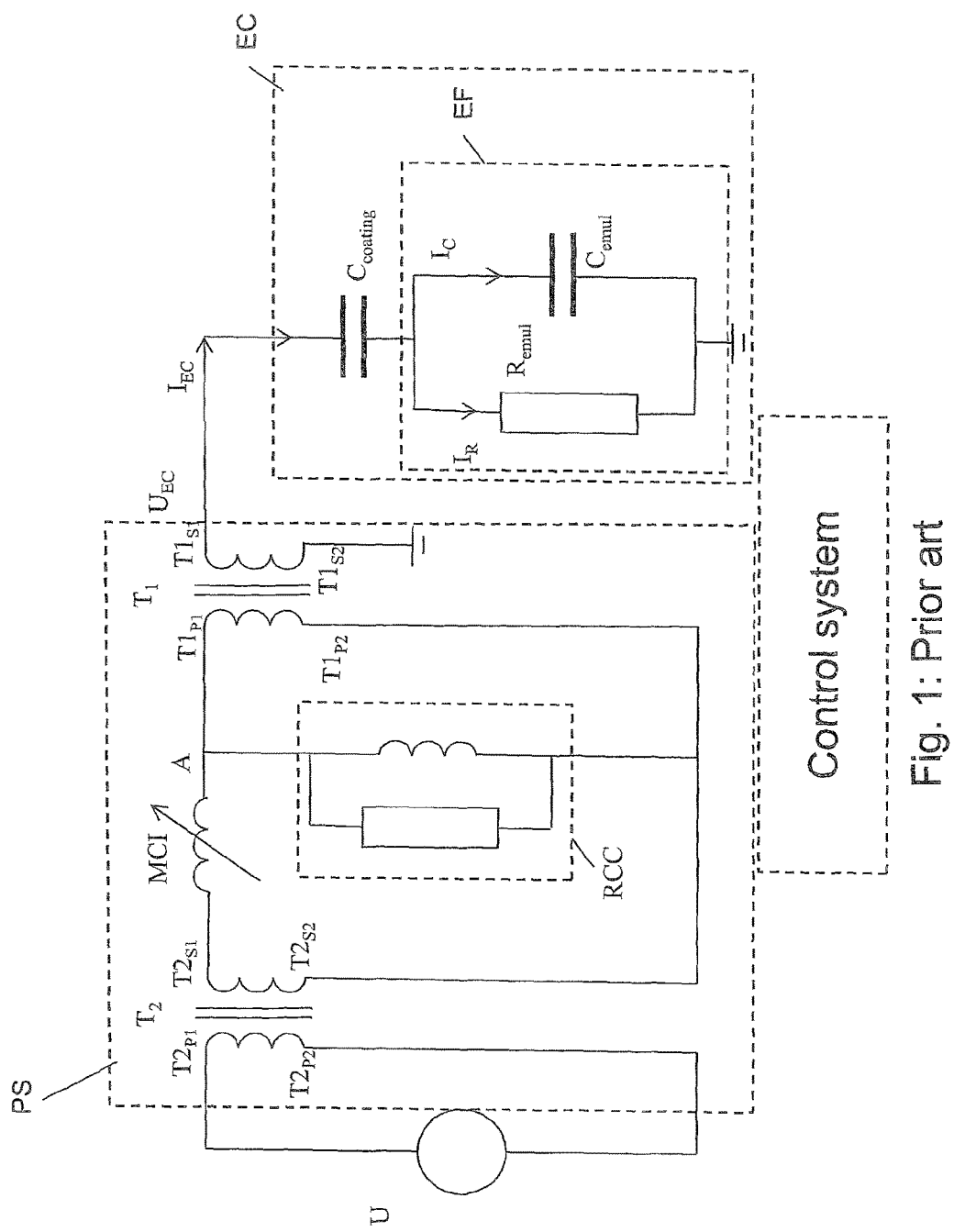
FIG. 1 illustrates a prior art power supply system for a coalescer.

Below, a table of typical data for the second embodiment above compared with the prior art system of FIG. 1 is shown.

TABLE 1

Technical data for second embodiment compared with prior art.

| | Prior art | Second embodiment (typical) |
|---|---|---|
| Weight of iron in MCI (total weight of MCI is about 2x the weight of iron) | >110 kg | 74 kg |
| Rating of T1, worst case | >30000 VA | 3500 VA |
| Maximum secondary voltage UEC of T1, worst case | >17000 V | 12000 V |
| Rating T2 (nominal input rating) | >27000 VA | 13000 VA |
| Rating of inductor in RCC | 37000 VA | 20000 VA |

As seen from table 1, it is possible to use a smaller first transformer T1 in the second embodiment above. It is also possible to use a smaller second transformer T2 and a smaller inductor in the resonant control circuit RCC.

THIRD EMBODIMENT

Figure 4:
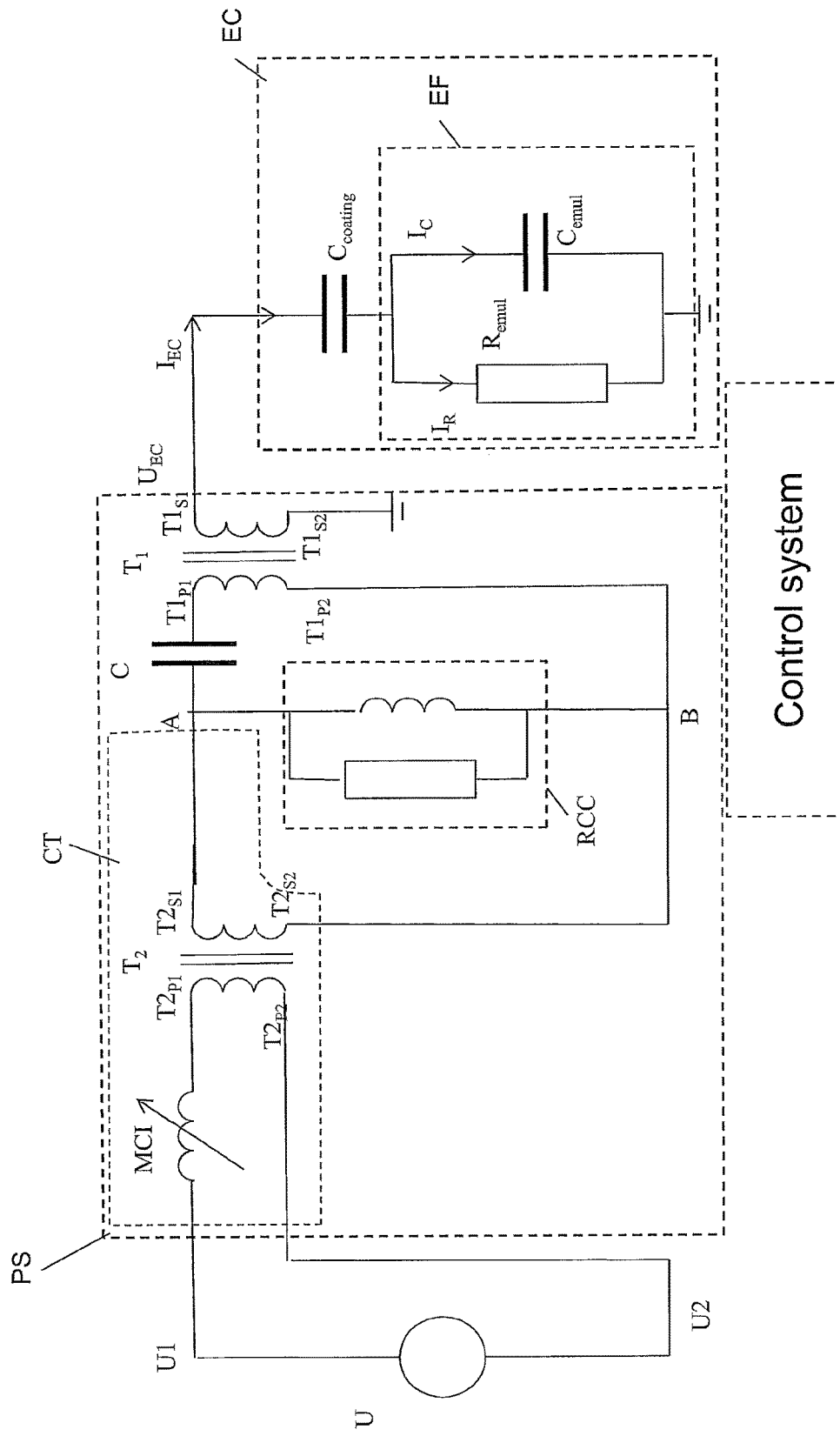
FIG. 4 illustrates a third embodiment of the power supply system for a coalescer.

It is now referred to FIG. 4. Most of the components in FIG. 4 are common with the components of FIG. 2, and the description of those components will not be repeated here. Also here, the controllable transformer CT comprises a second transformer T2 and a magnetic controllable inductor MCI, and the second transformer T2 has a primary winding with first and second primary terminals $T2_{P1}$, $T2_{P2}$ and a secondary winding with first and second secondary terminals $T2_{S1}$, $T2_{S2}$.

Here, the first terminal of the magnetic controllable inductor MCI is connected to the first primary terminal $T2_{P1}$ of the second transformer T2 and a second terminal of the magnetic controllable inductor MCI is provided for connection to a first terminal U1 of the AC power source U. The second primary terminal $T2_{P2}$ of the second transformer T2 is provided for connection to a second terminal U2 of the AC power source U. The second secondary terminal $T2_{S2}$ of the second transformer T2 is connected to the second node B. The first secondary terminal $T2_{S1}$ of the second transformer T2 is connected to the first node A.

FOURTH EMBODIMENT

Figure 5:
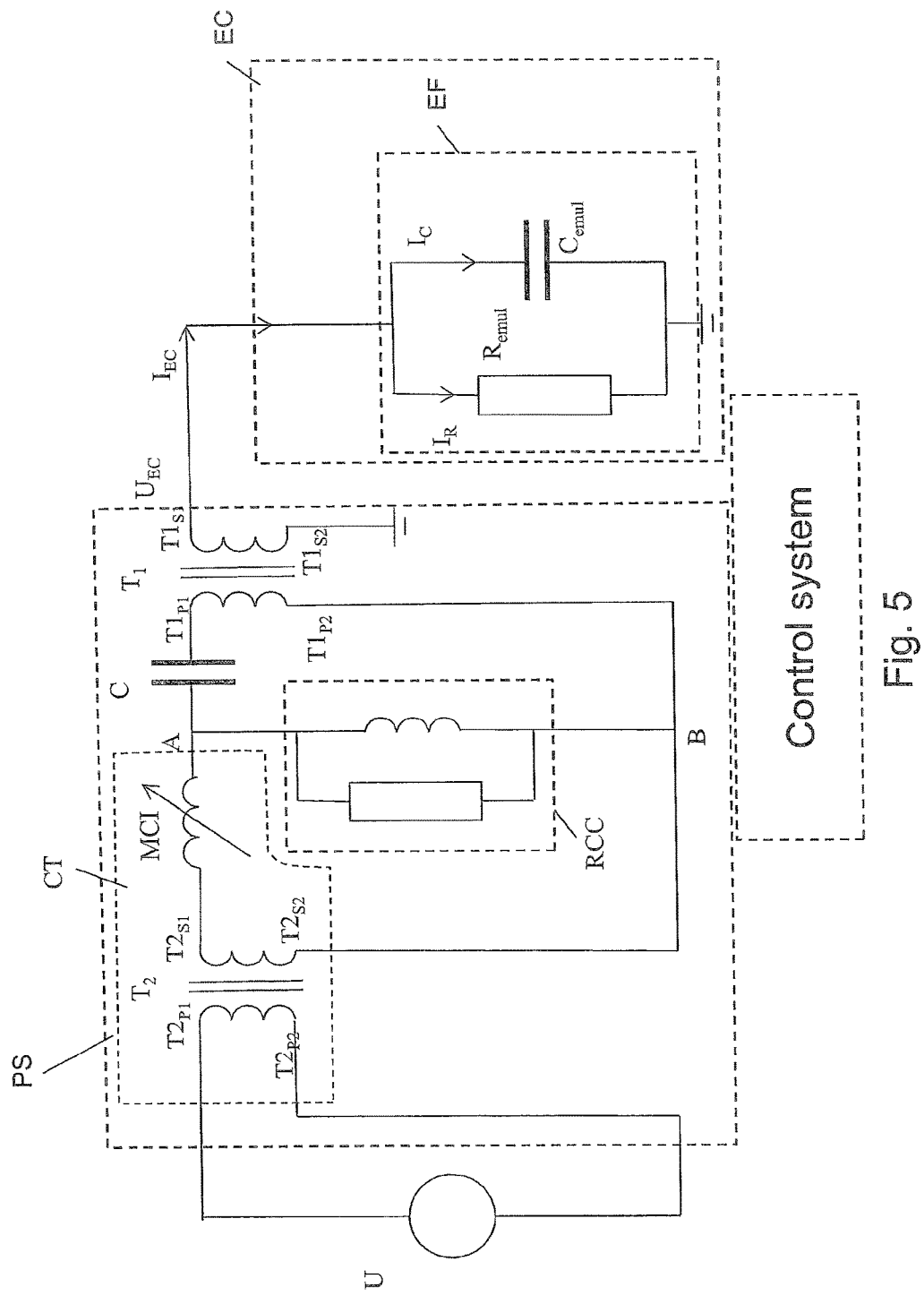
FIG. 5 illustrates a fourth embodiment of the power supply system for a coalescer.

It is now referred to FIG. 5. It has also been found that by providing the power supply system with the capacitor C, it is possible to use electrodes without coating. The reason for this is that the capacitor C will limit the short circuit current in case a short circuit current occurs in the fluid in the coalescer.

Hence, the power supply system is a power supply system for an AC type of coalescer (EC) where the coalescer is a coalescer with coating-less electrodes.

FIFTH EMBODIMENT

Figure 6:
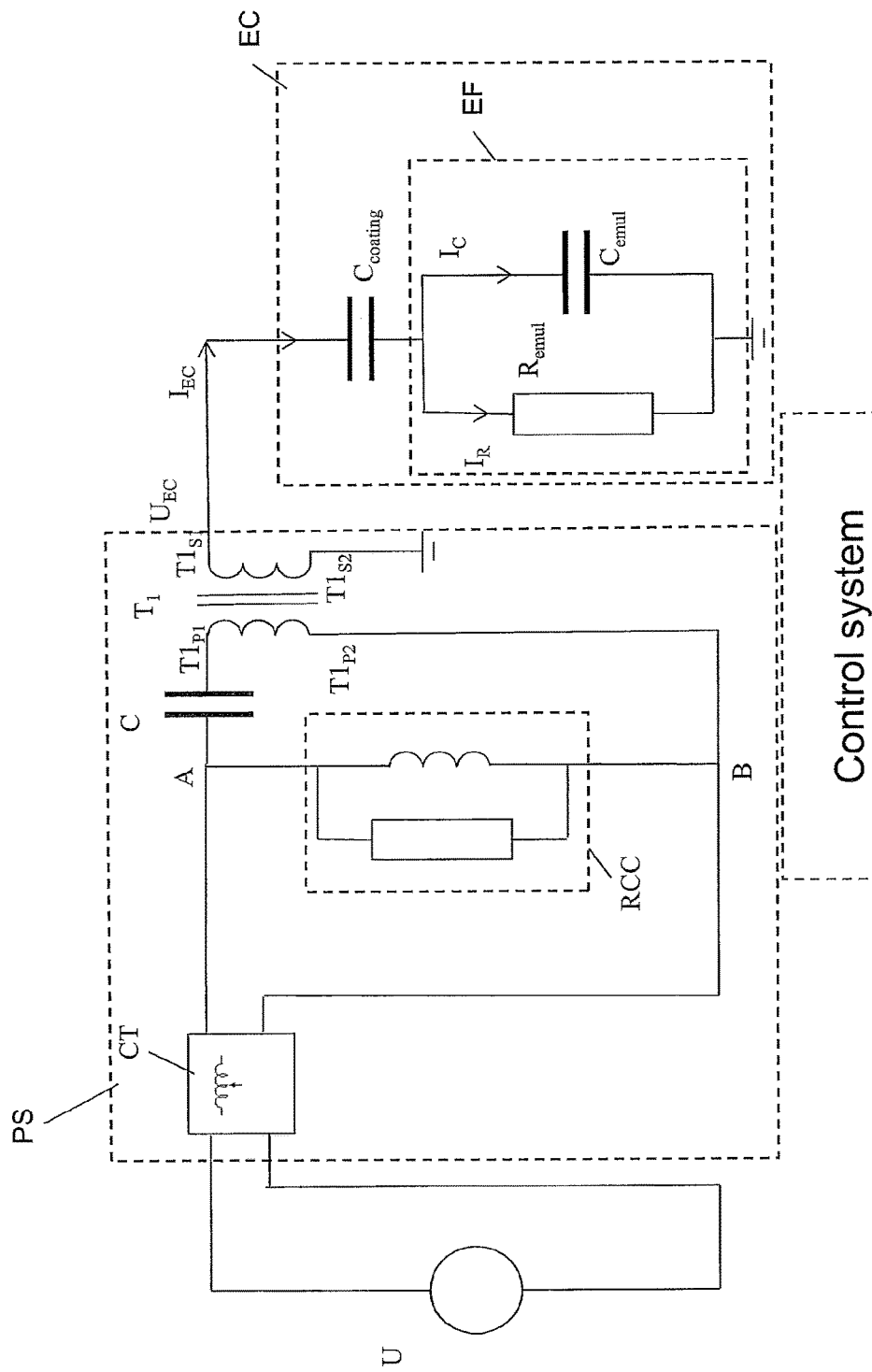
FIG. 6 illustrates a fifth embodiment of the power supply system for a coalescer.

It is now referred to FIG. 6. Most of the components in FIG. 6 are common with the components of FIG. 2, and the description of those components will not be repeated here.

Here the controllable transformer CT comprises a variac, i.e., a variable transformer. Alternatively, the controllable transformer may comprise other types of controllable transformers, such as a frequency converter in combination with controllable transformer CT.

Aspects that May Apply to Any One of the Embodiments

The following aspects may apply for any one of the exemplary first, second, third, fourth and fifth embodiments. They may also apply for any other embodiment within the scope of the invention.

The power source U may typically supply the controllable transformer CT with AC with voltage (rms) in the range 230V to 690 V. The typical output voltage of the controllable transformer CT may e.g. be in the range 500 to 900V (rms).

In all embodiments, the power supply PS comprises a first transformer T1, which may be a step-up up transformer. A typical output voltage of the first transformer T1 may be 5000 to 15000V (rms) with a high reactive power, where the reactive power can vary to any value in the range of 0-100%. The output voltage of the first transformer T1 may also be less or higher than this, it can for example be 2000 to 20000V (rms) with a high reactive power, where the reactive power can vary to any value in the range of 0-100%.

Simulations show that by providing the power supply system with the capacitor C the short circuit current is limited without using of fuses or limit switches and such, and is typically limited to certain value such as 1 A or 2 A or 5 A, or theoretically even higher for large systems.

Where the power supply system PS includes coated electrodes, the coating may have a dielectric strength of minimum two times the output voltage of the first transformer T1. For example when the output voltage of the first transformer T1 is 5000V (rms), the dielectric strength of the electrode coating should comply with a voltage of minimum 10 000V (rms), to meet this possible requirement. In any one of the disclosed embodiments, the capacitor C is an AC type of capacitor and a preferably film-based type of capacitor.

It is preferably thermally stable, and has preferably high current rating.

The capacitor should preferably be self-healing (i.e. the capacitor should not be permanently damaged by overvoltages).

The electrical properties of the coalescer EC, including the capacitance $C_{coating}$ representing coated electrodes, the resistance $R_{emul}$ of the fluid, and the capacitance $C_{emul}$ of the fluid, may assume a broad range of values, depending on the application in question.

For instance, if the fluid is essentially non-conducting, i.e. effectively pure oil, $R_{emul}$ may assume a rather high value, depending on, i.a., the dielectric properties of the oil. If the fluid contains a substantial amount of water, in particular salt water, $R_{emul}$ may assume a very low value. The capacitance $C_{emul}$ of the fluid may also vary in dependence of, i.a., dielectric properties of the oil. The volume and geometric structure of the coalescer will of course also influence its electrical properties, including $R_{emul}$ and $C_{emul}$.

The capacticance $C_{coating}$, representing coated electrodes may vary greatly with the design of the electrodes in the coalescer. If there is no coating on the electrodes, the capacitance $C_{coating}$ may be substituted by a short-circuit.

The capacitance of the capacitor C connected between the first node A and the first primary terminal $T1_{P1}$ of the first transformer T1 may be selected from a broad range of values, depending on, i.a., properties of the fluid in the coalescer, properties of the electrodes in the coalescer (coated or non-coated), the voltage applied to the coalescer electrodes, the AC frequency, etc.

In one embodiment the capacitance of C is preferably between 50 and 250 μF, in yet another embodiment the capacitance is between 100 and 200 μF. In a particular embodiment, the capacitance may be about 150 μF.

The capacitance of the capacitor C may also be larger than 250 μF. This may be particularly suitable when coating is not used on the coalescer electrodes. In some such instances, the capacitance of C may be in the range 100 μF to 1000 μF. In some other instances the capacitance of C may be in the range 100 μF to 5000 μF, for example when the electrode areas even larger and/or there are many electrodes.

The use of a capacitor on the primary side of the transformer T1 rather than on the secondary side of the transformer T1, has certain advantages. In particular, the capacitor may withstand lower voltage levels when arranged on the primary side than if it had been arranged on the secondary side.

The capacitor C may be selected from a broad range of capacitor types, including film capacitors, in particular film power capacitors, such as aluminium type film capacitors, with various types of dielectric material. Electrolytic capacitors, including aluminium and tantalum types may possibly be used, although a non-polarized capacitor will be the most appropriate choice.

Choice of other parameters such as voltage rating, current capacity, leakage current, temperature stability, etc. will be regular considerations for the skilled person in her/his choice of a suitable capacitor C.

It should also be appreciated that a network of interconnected capacitor elements, i.e. capacitor elements interconnected in series and/or parallel, may be applied for the capacitor C. In such a case, the component resulting from such interconnection should be encompassed by the term "a capacitor C". Such an interconnection of capacitor elements may also include other elements, e.g. elements with resistive and/or inductive electrical properties also connected in series or parallel.

The invention claimed is:

1. A system comprising:
an AC type of electrostatic coalescer comprising electrodes; and
a power supply system for the AC type of coalescer, the power supply system comprising:
a first transformer having a primary winding with first and second primary terminals and a secondary winding with first and second secondary terminals, where the first and second secondary terminals are connected to the electrodes of the coalescer;
a controllable transformer having a primary side for connection to an AC power source and a secondary side connected to first and second nodes, where the second node is connected to the second primary terminal of the first transformer;
a resonant control circuit connected between the first node and the second node;
a control system for controlling the controllable transformer; and
a capacitor connected between the first node and the first primary terminal of the first transformer.

2. The system according to claim 1, wherein the controllable transformer comprises:
a second transformer having a primary winding with first and second primary terminals and a secondary winding with first and second secondary terminals; and
a magnetic controllable inductor.

3. The system according to claim 2, wherein:
the first and second primary terminals of the second transformer are provided for connection to the AC power source;
the second secondary terminal is connected to the second node; and
the magnetic controllable inductor is connected between the first secondary terminal of the second transformer and the first node.

4. The system according to claim 2, wherein:
a first terminal of the magnetic controllable inductor is connected to the first primary terminal of the second transformer and a second terminal of the magnetic controllable inductor is provided for connection to a first terminal of the AC power source;
the second primary terminal of the second transformer is provided for connection to a second terminal of the AC power source;
the second secondary terminal of the second transformer is connected to the second node; and
the first secondary terminal of the second transformer is connected to the first node.

5. The system according to claim 1, wherein the controllable transformer comprises a variable transformer.

6. The system according to claim 1, wherein the AC type of coalescer is a coalescer with insulator-coated electrodes.

7. The system according to claim 6, wherein the coalescer includes coated electrodes having a dielectric strength of minimum two times an output voltage of the first transformer.

8. The system according to claim 6, wherein the capacitor has a capacitance between 50 and 250 µF.

9. The system according to claim 6, wherein the capacitor has a capacitance between 100 and 200 µF.

10. The system according to claim 1, wherein the AC type of coalescer is a coalescer with coating-less electrodes.

11. The system according to claim 10, wherein the capacitor has a capacitance between 100 µF and 5000 µF.

12. The system according to claim 11, wherein the capacitor has a capacitance between 100 µF and 1000 µF.

13. The system according to claim 12, wherein the capacitor has a capacitance between 250 µF and 1000 µF.

14. The system according to claim 1, wherein the capacitor is a film-based type of capacitor.

* * * * *